United States Patent [19]

Crawford

[11] Patent Number: 5,805,784
[45] Date of Patent: *Sep. 8, 1998

[54] COMPUTER STORY GENERATION SYSTEM AND METHOD USING NETWORK OF RE-USABLE SUBSTORIES

[76] Inventor: Christopher C. Crawford, 5251 Sierra Rd., San Jose, Calif. 95132

[*] Notice: The term of this patent shall not extend beyond the expiration date of Pat. No. 5,604,855.

[21] Appl. No.: 774,511

[22] Filed: Dec. 30, 1996

Related U.S. Application Data

[63] Continuation of Ser. No. 313,989, Sep. 28, 1994, Pat. No. 5,604,855.

[51] Int. Cl.$^6$ .................................................. G06T 13/00
[52] U.S. Cl. .......................... 395/173; 395/174; 395/806; 463/9; 463/23
[58] Field of Search .................................. 395/173, 174, 395/806; 463/9, 23

[56] References Cited

U.S. PATENT DOCUMENTS

| | | | |
|---|---|---|---|
| 5,358,259 | 10/1994 | Best | 463/31 |
| 5,377,997 | 1/1995 | Wilden et al. | 463/43 |
| 5,393,073 | 2/1995 | Best | 463/35 |
| 5,604,855 | 2/1997 | Crawford | 395/173 |

OTHER PUBLICATIONS

Knuth, *The Art of Computer Programming,* 1973, pp. 371–373.
Meston, "Realms of Arkania", *Compute,* v15, n12, Dec. 1993, p. 132.
Brenesal, "SSI challenges your intellect and your senses in a new game", *PC Magazine,* v10, n16, Sep. 1991, p. 498.
Dewey, "Saving the universe without your skateboard: new role playing fiction.", *Small Computer in Libraries,* v8, n10, Nov. 1988, p. 31.

*Primary Examiner*—Joseph H. Field
*Assistant Examiner*—Stephen Hong
*Attorney, Agent, or Firm*—Gary S. Williams; Flehr Hohbach Test Albritton & Herbert LL

[57] ABSTRACT

The storyline of a dynamically generated entertainment program, such as a video game, is generated using a matrix of reusable storyline fragments called substories. A set of characters that participate in the storyline is established and a set of reusable substories is defined. Each substory represents a "fragment of a story", usually involving an action by a subject, where the subject is one of the characters. Most substories can be reused multiple times with different ones of the characters being the subject and different ones of the characters being the direct object of the substory. Each substory has a set of possible reaction substories, which are a subset of the defined substories. A plan list stores plan data indicating ones of the substories to be performed at specified times. An initial "seed story" in the form of an initial set of substories is stored in the plan list. The substories stored in the plan list are executed at times corresponding to their respective specified times. For at least a subset of the executed substories, the end user of the system is either shown a video image representing the executed substory or is otherwise informed of the executed substory. In reaction to each executed substory, plans to perform additional ones of the substories are generated. The additional substories are ones of the set of possible reaction substories for each executed substory. Each plan to perform an additional substory is assigned a specified time and plan data representing the plan is stored in the plan list.

11 Claims, 9 Drawing Sheets

Personality Profile Table 160

| Char ID | Name | Location | Sex | Significant Other | OnStage | Pride | Good | Submissive | Empathy | Gullible | Initiative | Volatility | Strength | Greed | Lust | Sexiness | ... |
|---|---|---|---|---|---|---|---|---|---|---|---|---|---|---|---|---|---|
| 1 | Arthur | 6 | M | 0 | T | 95 | 70 | 10 | 50 | 30 | 80 | 50 | 90 | 20 | 60 | 60 | ... |
| 2 | Guenevere | 3 | F | 1 | T | 60 | 65 | 75 | 80 | 75 | 75 | 60 | 15 | 35 | 100 | 80 | ... |
| 3 | Merlin | 1 | M | 20 | T | 39 | 39 | 39 | 39 | 39 | 39 | 39 | 39 | 39 | 39 | 39 | ... |
| 4 | Lancelot | 6 | M | 0 | T | 60 | 70 | 10 | 60 | 30 | 80 | 35 | 100 | 20 | 100 | 99 | ... |
| 5 | Mordred | 3 | M | 10 | T | 95 | 5 | 10 | 10 | 0 | 80 | 15 | 40 | 90 | 80 | 30 | ... |
| 7 | Kay | 3 | M | 0 | T | 40 | 70 | 75 | 40 | 60 | 60 | 25 | 40 | 55 | 30 | 25 | ... |
| ... | ... | ... | ... | ... | ... | ... | ... | ... | ... | ... | ... | ... | ... | ... | ... | ... | ... |

Relationship Tables
164

Guenevere

| Char ID | Name | Dominance | Affection | Trust | Loquaciousness | Relationship | BloodTie |
|---|---|---|---|---|---|---|---|
| 1 | Arthur | -40 | 60 | 50 | 50 | 3 | F |
| 2 | Guenevere | 100 | 100 | 50 | 50 | 0 | T |
| 3 | Merlin | NA | NA | NA | NA | NA | NA |
| 4 | Lancelot | -50 | 80 | 50 | 60 | 1 | F |
| 5 | Mordred | -20 | -50 | 50 | 10 | 0 | F |
| 7 | Kay | -20 | 40 | 50 | 50 | 1 | F |
| 8 | Bedivere | 0 | 30 | 50 | 40 | 1 | F |
| 9 | Gawain | 20 | 40 | 50 | 40 | 0 | F |

Lancelot

| Char ID | Name | Dominance | Affection | Trust | Loquaciousness | Relationship | BloodTie |
|---|---|---|---|---|---|---|---|
| 1 | Arthur | -70 | 90 | 50 | 50 | 1 | F |
| 2 | Guenevere | 50 | 90 | 50 | 60 | 1 | F |
| 3 | Merlin | NA | NA | NA | NA | NA | NA |
| 4 | Lancelot | 100 | 100 | 50 | 50 | 0 | T |
| 5 | Mordred | 40 | -10 | 50 | -10 | 0 | F |
| 7 | Kay | 20 | 40 | 50 | 50 | 1 | F |
| 8 | Bedivere | 20 | 30 | 50 | 50 | 1 | F |
| 9 | Gawain | 20 | -30 | 50 | 50 | 1 | F |

FIGURE 7

| SubStory ID | Name | TimeTo Prepare | TimeTo Execute | Import | Audience | Expression |
|---|---|---|---|---|---|---|
| 1 | AbuseLover | 1024 | 1 | 40 | 2 | 45 |
| 2 | Accept Apology | 1 | 1 | 28 | 1 | 58 |
| 3 | AcceptRaid | 1 | 1 | 20 | 1 | 39 |
| 4 | AccompanyDigRoots | 1 | 1 | 20 | 1 | 47 |
| 5 | AccompanyBathing | 10 | 1 | 20 | 1 | 47 |
| ... | | | | | | |
| 12 | AccuseAmbush | 2 | 1 | 70 | 1 | 15 |

SubStory Param Table 170

FIGURE 8

COMPUTER STORY GENERATION SYSTEM AND METHOD USING NETWORK OF RE-USABLE SUBSTORIES

This application is a continuation of application Ser. No. 08/313,989, Sep. 28, 1994, U.S. Pat. No. 5,604,855.

The present invention relates generally to computer operated video games and computer operated entertainment programs, and particularly to a methodology for generating stories and sequences of events involving interactions between fictional characters where the generation of each sequence of events utilizes a matrix of re-usable substories whose use and selection is based on personality profiles of the fictional characters, user selections or commands, past events remembered by the fictional characters, as well as random factors.

BACKGROUND OF THE INVENTION

Most commercially available video games available in 1994 are (A) highly violent warfare motifs that test the user's reflexes and knowledge of the rules of the game, (B) "exploration" games in which the user passes though and explores various places, (C) simulator games such as flight simulator games, which are a variation on exploration games but which test a user's ability to operate a simulated vehicle or other device while exploring various simulated places, and (D) card games and computer operated versions of "board games". While this list is not exhaustive, it serves to highlight the differences between the present invention and what preceded it.

The present invention represents a new video game methodology that generates a storyline using a set of re-usable substories. In particular, substories represent an action or event that can take place in the execution of a game, and furthermore, most substories represent actions that can be performed by many of the fictional characters in the game. Thus, each substory will have a set of variables, usually including a "subject" (the character performing the action in the substory), and a direct object (the person, if any, who is the target or recipient of the action). Some substories have additional objects (additional persons who are the targets or recipients of the action), indirect objects (e.g., the action by the subject on the direct object relates in some manner to the indirect object. For instance a substory whose title might be (DefendsOther) might represent A (the subject) defending B (the indirect object) against an attack by C (the direct object).

The characters fulfilling the various roles of each selected substory are dynamically assigned during the execution of the game, and each substory can be reused numerous times with the same or different characters fulfilling the various roles associated with the selected substory.

The present invention also allows for much more "human" interactions between characters. For instance, characters can be assigned personality traits such as pride, empathy, gullibility, initiative, volatility, strength, greed, lust and sexiness, as well as interpersonal relationship traits such as affection, dominance, trust, blood ties, and loquaciousness that define each character's specific relationship to other characters in a game.

An important characteristic of the present invention is that interactions between fictional characters in games utilizing the present invention can be based on events that happened in the past (i.e, earlier in the game). Some prior video games make some minimal use of "history", primarily by (A) retaining ongoing scores for various players, (B) making a game more difficult to play as the user reaches higher score levels, (C) remembering which players that have been eliminated.

Unlike such minimal uses of history, in the present invention fictional characters chose to perform actions based on historical events, such as because Character A hurt (or insulted, killed, helped, didn't help, raped, or saved) my sister (brother, other relationship), I'm going to do the following to Character A.

Another example of using "history" in accordance with the present invention is as follows. Assume that Character A and Character B have had a number of prior interactions in which Character A hurts or insults Character B. Each time that the system selects a reaction for Character B, the system searches for a specific types of prior events in which Character B is the subject and Character A is the direct object. For instance, if Character B has already done actions 1, 2 and 3 in the past, then the system will select a particular reaction substory (e.g., a different action 4) based on that information. This and other types of "sequence of reactions" can be implemented for numerous types of substories. In this way, the game can have characters perform sequences of actions that have logical connections and order, thereby giving the generated games a feeling of robustness.

Another feature of the present application that is unlike prior products is that part of "what happens" in a game or computer generated entertainment program in the present invention happens in the form of news or "gossip" told by one fictional character to another. In this way information is communicated from one character to another, allowing additional characters to "choose" actions based on that information. In particular, when a character is told of a past event, the system may generate a reaction plan to be executed by that character in the future where the reaction plan is specifically in reaction to the past event.

The present invention uses a matrix of re-usable substories which are "selected" during the execution of a game. Any given event during the execution of game or computer generated entertainment program in the present invention is an instance of a predefined substory, with a particular subject and direct object used during the execution of the substory instance. The characters who witness an event or who are told of an event react to the event or news by "making plans" for the future. The "choices" made by fictional characters in the present invention are, in fact, selections of ones of the substories in the matrix of substories provided by the present invention.

A "plan" is a substory selection for execution "by" one of the characters (i.e., with the character to whom the plan is assigned being the subject of the plan). One aspect of each substory is that each substory has an associated set of "consequent substories", which is a finite set of reaction plans that the subject, direct object or any witnesses of an event (i.e., an executed substory) may make in response to the event. All the possible plans that the event's participants and witnesses may make in reaction to the event are evaluated and a subset of those possible plans are selected in accordance with story line weights that are computed or otherwise assigned to the set of possible reaction plans. The selected reaction plans are then entered into a plan list or queue for later execution.

SUMMARY OF THE INVENTION

In summary, the present invention is a system and method for dynamically generating the storyline of an entertainment program, such as a video game. The storyline is generated using a matrix of reusable storyline fragments called substories.

A set of characters that participate in the storyline is established and a set of reusable substories is defined. The characters are assigned personality traits that are used during execution of the entertainment program to select substories for including in the storyline.

Each substory represents a "fragment of a story". Most substories involve an action by a subject, where the subject is one of the characters, but some substories do not involve any overt action other than making a plan to do something or telling something (e.g., about a past event, or a lie) to another character. Most substories can be reused multiple times with different ones of the characters being the subject and different ones of the characters being the direct object of the substory. Each substory has a set of possible reaction substories, which are a subset of the defined substories.

A plan list stores plan data indicating ones of the substories to be performed at specified times. An initial "seed story" in the form of an initial set of substories is stored in the plan list. The substories stored in the plan list are executed at times corresponding to their respective specified times. For at least a subset of the executed substories, the end user of the system is either shown a video image representing the executed substory or is otherwise informed of the executed substory.

In reaction to each executed substory, plans to perform additional instances of the substories are generated. The additional substories are ones of the set of possible reaction substories for each executed substory. Each plan to perform an additional substory is assigned a specified time and plan data representing the plan is stored in the plan list. Each plan that is put in the plan list specifies a substory, a designated subject and direct object, and an execution time. The designated subject and direct object in each plan are usually related to the participants of the previous event to which the plan is a reaction.

Personality parameters in the character's personality profiles are used as input parameters to functions that are used to select the substory to be performed in reaction to an executed substory. Furthermore, character reactions to executed substories include "emotional reactions" that are used to change those characters' personality profiles.

BRIEF DESCRIPTION OF THE DRAWINGS

Additional objects and features of the invention will be more readily apparent from the following detailed description and appended claims when taken in conjunction with the drawings, in which:

FIG. 6 is a schematic representation of a personality profile table data structure used in a preferred embodiment the present invention.

FIG. 7 is a schematic representation of personality relationship tables used in a preferred embodiment the present invention.

FIG. 8 is a schematic representation of a substory parameters array data structure used in a preferred embodiment the present invention.

DESCRIPTION OF THE PREFERRED EMBODIMENTS

Figure 1:
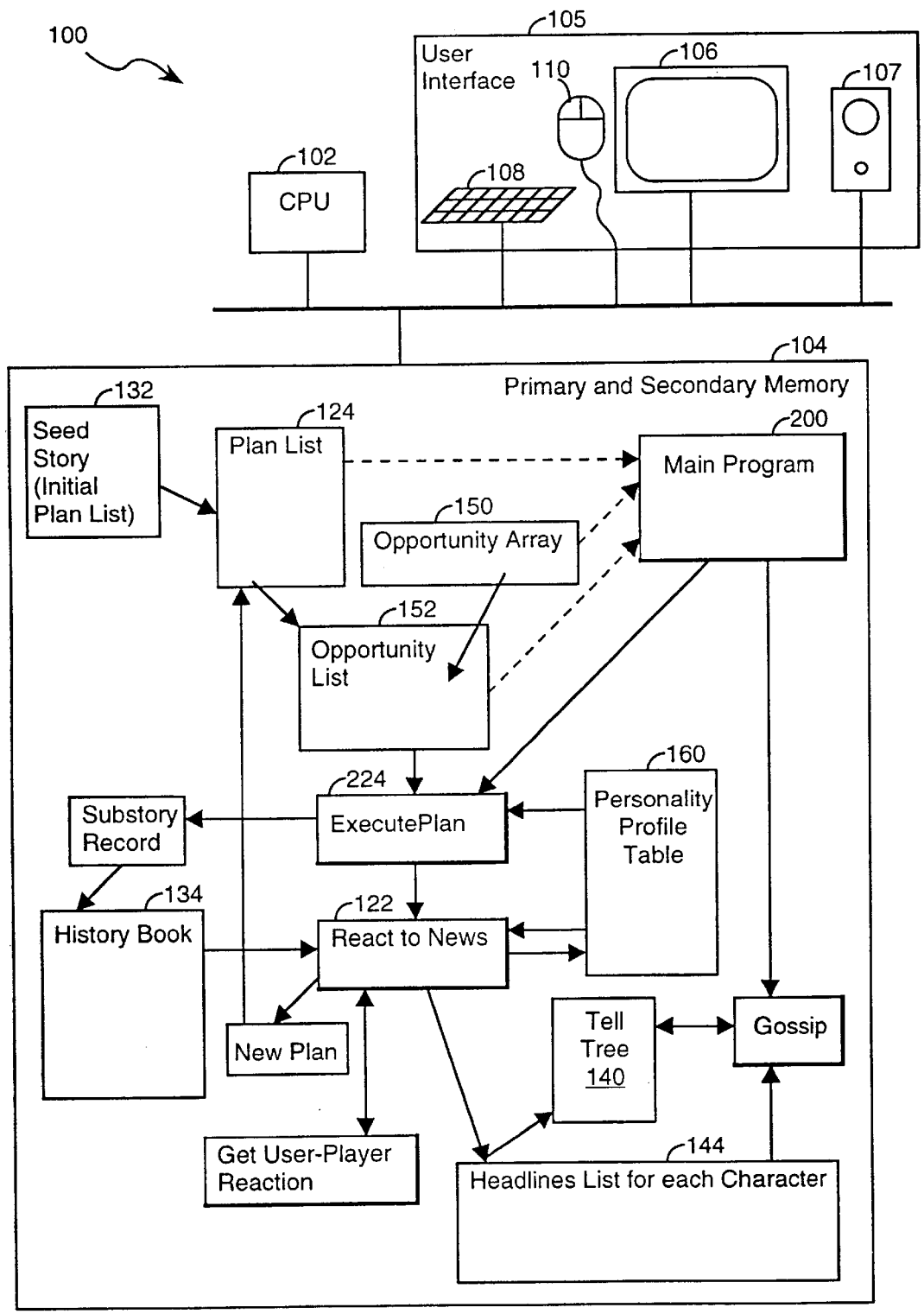
FIG. 1 is a block diagram of a video game incorporating the present invention.

Referring to FIG. 1, there is shown a computer system 100 incorporating a preferred embodiment of the present invention. The system 100 will typically be either an arcade game machine or a desk top computer such as a Macintosh computer made by Apple Computer Inc., or a "PC-compatible" computer such as those made by IBM, Compaq and many other companies. The computer 100 generally includes a CPU 102, primary and secondary memory 104 and a user interface 105 that includes a display 106, audio speaker 107, and one or more user input devices 108, 110 such as a keyboard 108, mouse pointing device 110, joystick (unshown), and push buttons (unshown).

Substories and Characters

A typical implementation of the present invention will be a video game or other entertainment program that incorporates anywhere from a few dozen to several thousand "substories", which are herein defined to be story fragments. In the Figures, there is no specific data structure representing the actions performed by the substories because, in the preferred embodiment, the substories are implemented as portions of the programs labelled ExecutePlan 120 and ReactToNews 122 in FIG. 1. In other implementations, substories may be implemented by table lookup schemes known to those skilled in the art, with a dictionary of possible "actions" that are referenced by the various substory entries in a substory table.

The entertainment program will typically have two or more "characters" who represent persons and/or other active players in the story line. Some entertainment programs may have dozens of characters, such as entertainment programs with complicated storylines. In other entertainment programs using the invention, there may as little as one character that represents a person or animal or the like, with the other "characters" being parts of the environment that can react and perform actions in reaction to the actions performed by the character.

Most, but not necessarily all, substories have as assignable parameters a subject, a direct object, and sometimes one or more indirect objects. The subject, direct object and indirect objects are ones of the characters. Some substories may have preassigned and unchangeable subjects and direct and indirect objects, such as actions performed by various key characters in a particular storyline. For instance, only the "hero" or "villain" of a story may be allowed to perform certain substories. However, it is anticipated that most substories will have one or more character parameters that can be dynamically assigned during the performance of the entertainment program.

Figure 2:
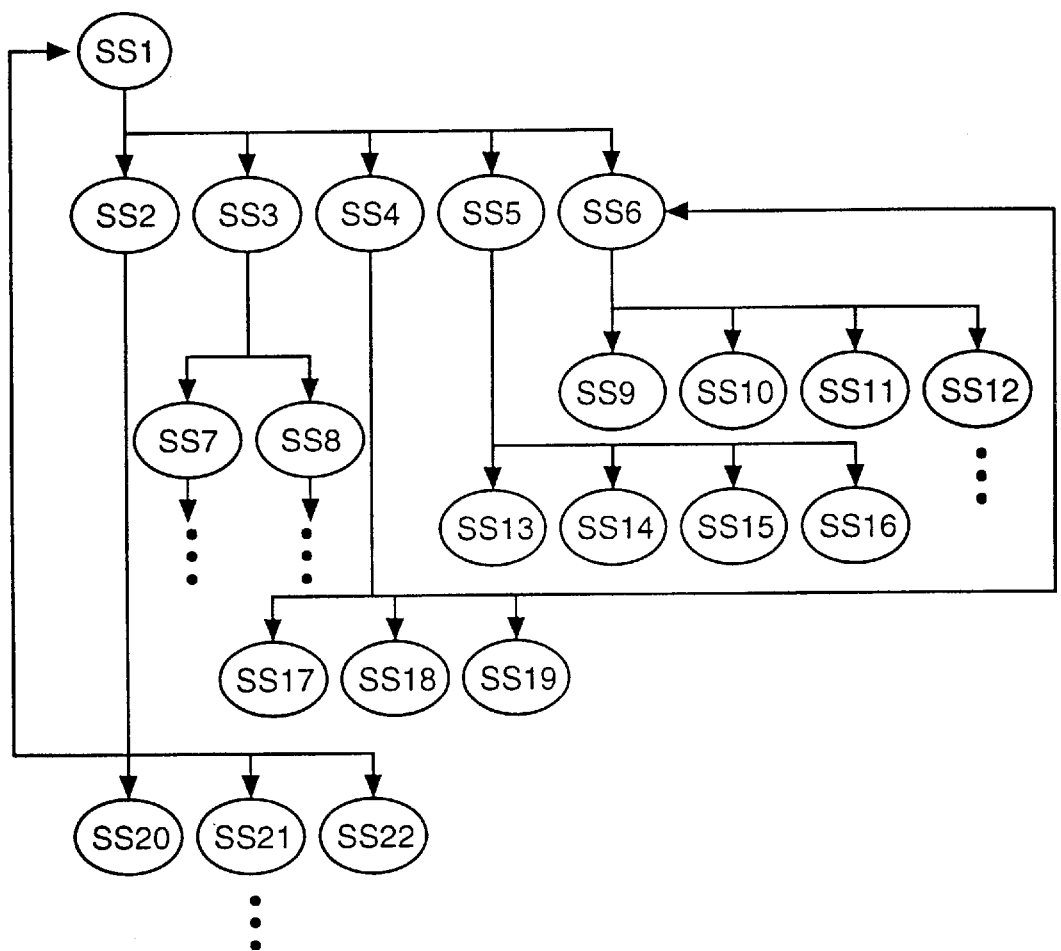
FIG. 2 is a conceptual representation of a matrix of reusable substories.

Referring to FIG. 2, a key aspect of the invention is that most substories are "reusable". In the present context, "reusable" means: (A) that the same substory can be executed with different characters as the subject (i.e., protagonist) of the substory, or (B) that the same substory can be executed with different characters as the direct object (i.e., the character on which an action is performed or the character with respect to which an action is performed), or (C) both A and B. In addition, in those substories having indirect objects, for example when an action is performed on behalf of someone else or when a action is performed that affects more than one character, the indirect objects are almost always dynamically assignable.

As shown in FIG. 2, a directed graph representation of the set of reusable substories and their respective sets of possible reaction substories includes numerous loops (sometimes called loopbacks). As a result, during the execution of a entertainment program using the present invention, each of at least a multiplicity of the substories will be executed a plurality of times with different ones of the characters participating as the subject and object(s) thereof during each execution of each such reused substory.

In FIG. 2, substories SS2–SS6 represent the set of reaction substories that can be selected in reaction to execution of substory SS1. Similarly, substories SS7–SS8 represent the set of reaction substories that can be selected in reaction to execution of substory SS3, substories SS9–SS12 represent the set of reaction substories that can be selected in reaction to execution of substory SS6, substories SS13–SS16 represent the set of reaction substories that can be selected in reaction to execution of substory SS5, substories SS17–SS19 and S6 represent the set of reaction substories that can be selected in reaction to execution of substory SS4, and substories SS20–SS22 and SS1 represent the set of reaction substories that can be selected in reaction to execution of substory SS2. As mentioned above, this "matrix" of substories loops back on itself, and in full implementations such loopbacks are numerous. Loopbacks in the set of available reaction substories does not mean that the user sees the same actions performed multiple times. Rather different sets of the characters will be participants in the actions represented by the substories. Thus instances of substory SS2 may be executed numerous times, but each such instance of substory SS2 may be executed with different characters as the subject and direct object of the substory.

It should be noted that while the subject and direct object of most substories are assignable, there may be limitations on which characters can be assigned to those roles. For instance, the entertainment program may require that the direct object of some substories to be female characters and may limit the subjects or direct objects of various substories to be male characters. Similar possible limitations on the characters who can be assigned the roles of subject, direct object or indirect object are: adult characters, child characters, animal characters, characters who have previously in the storyline witnessed a particular event, characters who have been previously in the storyline have been the direct object or subject of a particular substory, and so on.

Appendices 1–6 contain pseudocode representations of software procedures relevant to the present invention. The pseudocode used in these appendices is, essentially, a computer language using universal computer language conventions. While the pseudocode employed here has been invented solely for the purposes of this description, it is designed to be easily understandable by any computer programmer skilled in the art.

Figure 3:
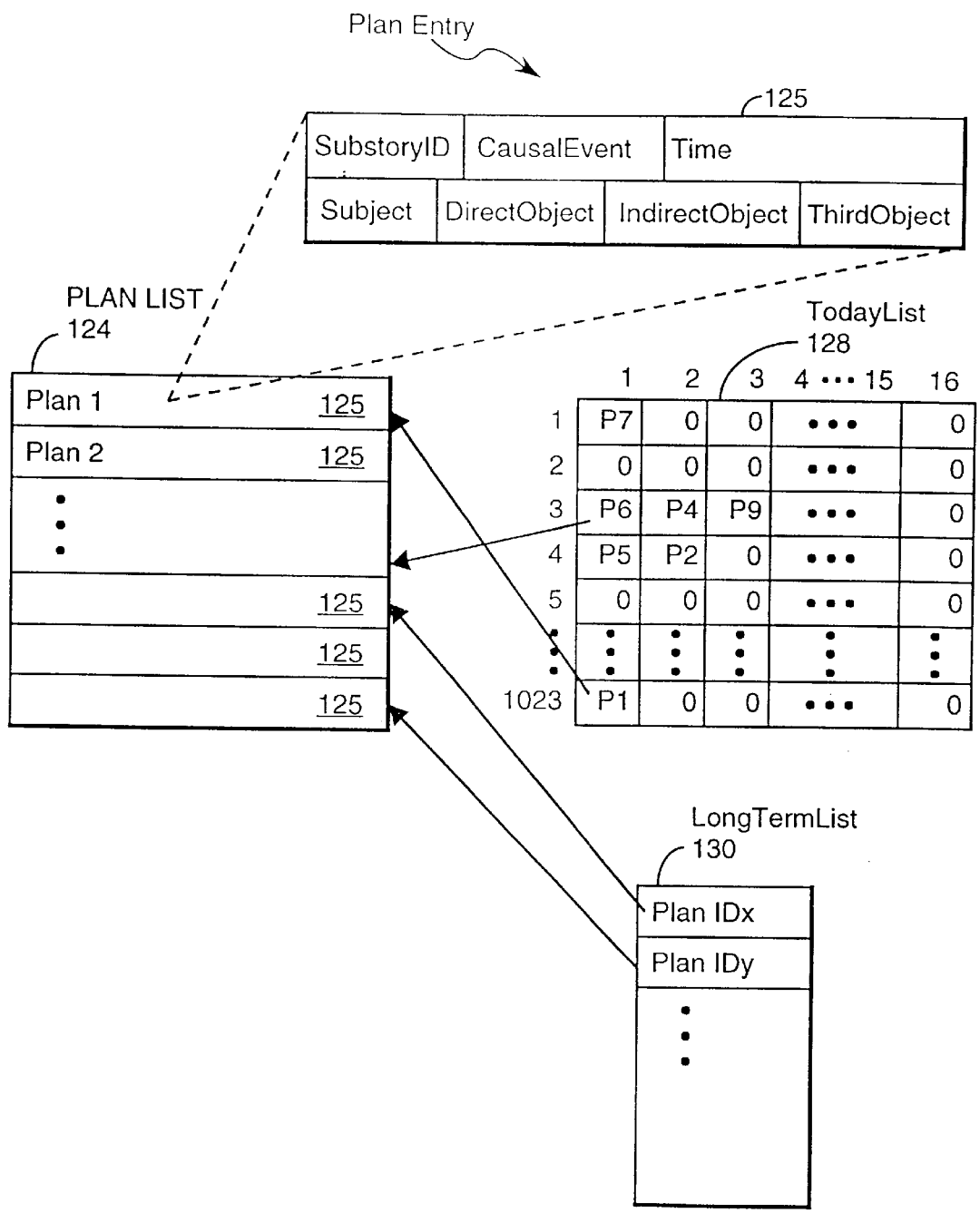
FIG. 3 is a schematic representation of a plan list data structure used in a preferred embodiment the present invention.

The Primary Data Structures
Plan List, History Book, Tell Tree, Headlines List, Opportunity Array and List, Personality Profiles, Character Relationship Array Referring to FIGS. 1 and 3, the Plan List 124 is a list of substories that are to be performed in the future. It should be understood that the entertainment program in the preferred embodiment has a scheduler that keeps track of the passage of time in the "simulated world" of the storyline that is being generated by the entertainment program. The Plan List data structure 124 is essentially a set of slots or plan entries 125 for storing substory plans.

Each plan entry 125 (sometimes called simply "plans") includes the following parameters:
  a Substory identifier, indicating the substory to be executed, also herein called the "Substory verb",
  a CausalEvent, indicating which previous event (if any) is the "cause" of the planned event,
  a Time, indicating the earliest time at which the planned event should be performed,
  a Subject, which is the character who is to be the executor or primary actor for the planned event,
  a DirectObject, which is the character who is to be the direct object (e.g., the character at the receiving end of the Subject's actions or a co-actor with the Subject) of the planned event,
  an IndirectObject, which is the character who is to be the indirect object (if any) for the planned event, and
  a ThirdObject, when not given a null value, is usually a thing (such as a gift of other physical object upon which an action is performed), an event in the History Book, or a character who plays a particular role in the planned event.

Associated with the Plan List 124 is a TodayList 128 that stores a matrix of pointers to plan entries 125 in time sequence order for all plans that are to be performed within a certain time period in the simulated world called a "day". The amount of real time that it takes for the storyline to progress by one "day" is variable, depending on the number of substories executed for that "day".

A LongTermList 130 stores a list of pointers to plan entries in time sequence order for all plans that are to be performed after the current "day".

The Plan List 124 is garbage collected once per simulated "day" to remove plans that have been executed and to move the remaining plans to the top of the list 124 so that the empty plan entry slots 125 are in a contiguous section of the Plan List data structure 124.

The Seed Story 132 (see FIG. 1) is a set of initial plan entries that are stored in the Plan List 124 when the program is initialized. The Seed Story not only starts the storyline, but can be used to "guide" the generated storyline so as to guarantee that certain event happen during the generated storyline and thus to enable various other substories that may not be accessible except as descendants of the initial plan entries.

In some embodiments more than one Seed Story may be provided. For instance, the entertainment program might be programmed to automatically add an additional seed story to the Plan List 124 whenever no events are planned for a particular length of time or, alternately, whenever the Plan List 124 is entirely empty.

Figure 4:
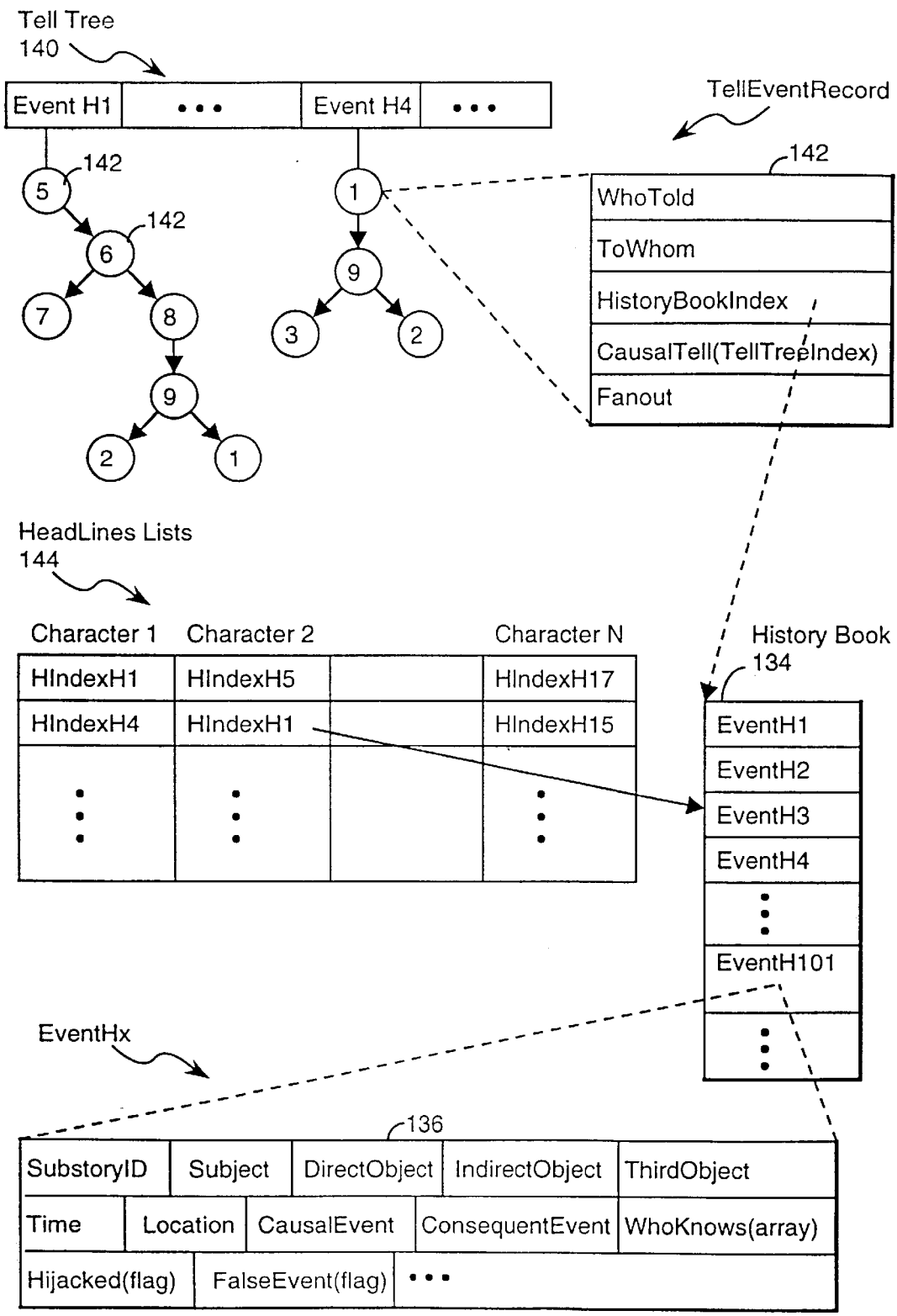
FIG. 4 is a schematic representation of the history book, tell tree and headlines lists data structures used in a preferred embodiment the present invention.

Referring to FIGS. 1 and 4, the History Book 134 is a list of history event entries 136 representing substories that were performed in the past, and thus are "history". In the present invention, historical events can play a larger role than is the case in previous computer generated entertainment programs. For example, in the preferred embodiment, information regarding past events is communicated by allowing the characters to tell each other about such events, and then allowing the recipients of the conveyed information to make plans based on the received information.

Each History book entry 136 includes the following parameters:
  a Substory identifier, indicating the substory that was executed, a Subject, which is the character who was the executor of the event, a DirectObject, which is the character who is the direct object of the event, an IndirectObject, which is the character who is the indirect object (if any) for the event, a ThirdObject (if any), which is the object, event or character utilized in the execution of the event, a CausalEvent, indicating which previous event (if any) is the "cause" of the event, a Time, indicating when the event was performed, Location, indicating where the event was performed, ConsequentEvent, indicating another History book entry representing the most recent event that happened in response to the event represented by the current history book entry, a WhoKnows array of flags (one flag for each of the defined characters), indicating which characters know about this event, a Hijacked flag, which is set to true if the event represented by the current history book entry was "hijacked" by an observer of the event (as will be explained below with respect to the "ReactToNews" procedure, and a FalseEvent flag, which is set to true if the event represented by the current history book entry did not happen, but has been told by one character to another as a lie.

Tell Tree and Headlines Lists

Referring to FIGS. 1 and 4, the Tell Tree 140 is a set of directed graphs representing who has been told about various events, and indicate who told each person about each such event. For instance, the tell tree 140 shown in FIG. 4 indicates that for event H1, character 5 (who witnessed the event) told character 6, who in turn told characters 7 and 8 of the event. Character 8 then told character 9, who in turn told characters 1 and 2.

Each node 142 of each Tell Tree graph is called Tell Event Record and includes data representing the character (WhoTold) who told another character (ToWhom) of the event corresponding to the directed graph, the History Book index (HistoryBookIndex) indicating where in the History Book 134 the event is stored, the Tell Tree index (TellTreeIndex) of the node's parent node (if any) in the Tell Tree 140, and the Fanout (i.e., the number of characters the WhoTold character has told about the event. Since it is never necessary in the preferred embodiment to trace down the tree, no such pointers are provided.

To prevent the tell tree from becoming excessively large, the contents of the tree are limited to entries necessary to determine the knowledge derivation of events in each character's Headlines List 144.

The Headlines Lists 144 is a list of up to N events (sixteen in the preferred embodiment) for each character. The Headlines List 144 for one character represents the N "most newsworthy" events known to that character. In the preferred embodiment, each substory has an associated "newsworthiness" value called its "import". This import value is adjusted upwards or downwards based on the relationship of the Headlines List's owner's relationship to the subject and direct object of the event. In particular, the substory's nominal import value is increased when the owner of the headline list has a positive affection value for the subject and is further increased when the headline list owner has a positive affection for the direct object of the event; the substory's nominal import value is decreased when the owner of the headline list has a negative affection value for the subject and/or direct object of the event.

Each time a character witnesses an event or is told of an event by another character, a pointer to that's event's record in the History Book 134 is added to the character's Headlines List 144 if (A) there is at least one empty slot in the character's Headlines List 144 and the event meets a minimum newsworthiness threshold, or (B) if the event is of greater newsworthiness than the least newsworthy event currently in the character's Headlines List. In the latter case, the new event displaces the least newsworthy event currently in the character's Headlines List. The new event is inserted into the Headlines List such that all the items in the Headlines List are ordered by their import.

In alternate embodiments, the Headlines List 144 might simply represent the N most recent events of any news value whatsoever that the character knows about.

When an event is displaced from a character's Headline's List 144, if the event is a leaf node in the Tell Tree 140, that leaf node is deleted from the Tell Tree 140. In addition, the deleted node's immediate ancestor node is inspected to see whether (A) ancestor node has no remaining children, and (B) the event is still in the respective character's Headline List. The ancestor node is deleted from the Tell Tree 140 if the node has no children and the event is not in the respective character's Headline List 144. The process of inspecting and deleting ancestor Tell Tree nodes is repeated until all the Tell Tree nodes for the event are deleted or a node is reached that cannot be deleted. If an event displaced from a character's Headline List 144 does not correspond to a leaf node in the Tell Tree 140, the corresponding Tell Tree node is not deleted.

Opportunity Array and List

Figure 5:
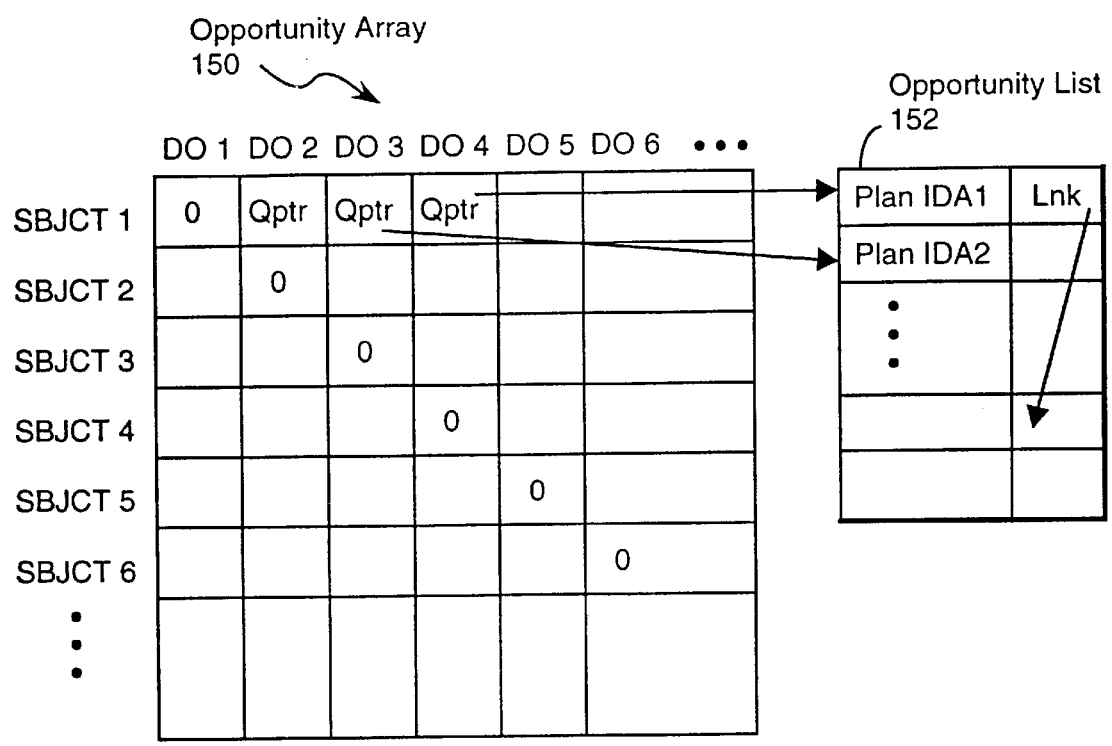
FIG. 5 is a schematic representation of opportunity array and opportunity list data structures used in a preferred embodiment the present invention.

Referring to FIGS. 1 and 5, the Opportunity Array 150 and Opportunity List 152 are data structures used to quickly find plans (i.e., scheduled substories) in which a first specified character is the subject and another specified character is the direct object. More particularly, the Opportunity List 152 stores a set of pointers to those items in the Plan List 124 whose associated scheduled Time has already been reached. Thus the Opportunity List 152 represents all planned substories that are available for immediate execution.

A "character's Opportunity List" is herein defined to mean all the entries in the Opportunity List 152 for which that character is the subject.

The Opportunity Array 150 represents for each possible pairing of two Characters, a pointer to a first item (planned substory) in the Opportunity List 152, if any, for which the first Character is the subject and the second Character is the direct object. A null value is stored in each Opportunity Array entry for which there is no planned substory with the corresponding Subject and Direct Object.

When at least one planned substory is present in the Opportunity List 152 for a particular pair of characters, the corresponding Opportunity Array 150 points to the item in the Opportunity List for that pair of characters with the earliest associated Time value. When there is more than one planned substory in the Opportunity List 152 for a pair of characters, the second parameter of each of the associated items in the Opportunity List is used to form a linked list of the planned substories for the pair of characters.

As will be explained in more detail below, the Opportunity Array 150 and Opportunity List 152 are used as follows.

At various times, the various characters in a storyline move from one location to another and a character is selected (e.g., the moved character is selected) and given the opportunity to perform a substory. At this time, all the selected character's entries in the Opportunity Array 150 corresponding to the other characters at the same location are inspected. If at least one of those Opportunity Array entries reference a planned event, then one of the planned events in which the selected character is the subject will be performed. In the preferred embodiment, the planned event with the earliest time value for which the direct object is at the same location as the selected character is the planned event selected for execution.

After a planned event is executed, the executed event is removed from the Plan List and the Opportunity List and the Opportunity Array is updated accordingly.

Personality Profiles

Referring to FIG. 6, the preferred embodiment of the present invention establishes a Personality Profile table 160 for the defined characters. In the preferred embodiment, each character has a personality profile 162 that is defined with respect to sixteen or so parameters, including Location (i.e., where the character is currently positioned), Sex (male or female), Significant Other (the identifier of the character's significant other), OnStage (indicating whether the character is at least potentially available to participate in substory execution), as well as a dozen or so numerically scaled personality traits including Good, Submissive, Empathy, Gullible, Initiative, Volatility, Strength, Lust, Sexiness, and so on. The numerically scaled personality traits have a scale of zero to 100 in the preferred embodiment.

The personality profiles 162 are used during execution of the entertainment program to determine each character's reactions to executed substories, and thus to select what substory each character would most likely select as a reaction to the event (i.e., executed substory). More particularly, for each substory there are (A) a set of possible consequent substories, and (B) a corresponding set of "reaction formulas" that are used to determine the weight of each possible consequent substory with respect to each possible subject of those consequent substories. The set of possible subjects of the consequent substories is generally the witnesses of the event (the characters at the same location other than the subject and direct object of the event), the direct object of the event, and the subject of the event. The weights of all the possible substories for all the possible subjects are evaluated, and one or more are selected to be planned events in accordance with predefined planned substory selection criteria that will be discussed below.

Another aspect of the personalities of the characters that is not represented in the personality profile table 160 are pairwise relationships between the various characters. These pairwise relationships are represented by data stored in a relationship table 164 for each of the defined characters. For instance, as shown in FIG. 7, in the preferred embodiment, for every possible pairing of characters, the following numerically scaled relationship parameters are defined: Dominance, Affection, Trust and Loquaciousness, which are each scaled within a range of −100 to +100. For instance an Affection value of 90 indicates a very strong feeling of affection by one character for another, while an Affection value of −30 indicates mild dislike. Note that Dominance values between characters are not necessarily reciprocal, although they are often close to being reciprocal, while Affection values are often not matched (i.e., character A may like or dislike character B more than the character B likes or dislikes character A).

In addition, the type of Relationship between characters is defined by a Relationship parameter. The interpretation of the Relationship parameter depends on whether or not the two characters are of different or the same sex. In particular, a Relationship parameter equal to 0 indicates no special relationship, 1 indicates "dating" (different sex) or a friend (same sex), 2 indicates lovers (if different sex) or "blood-brothers" (same sex), and 3 indicates married (if different sex) or "co-conspirators" (same sex). Finally, a boolean flag labelled BloodTie is provided for each pair of characters to indicate if the two characters are blood relatives.

Substory Parameter Table

Referring to FIG. 8, each of the defined substories is assigned certain parameter values (stored in Substory Parameter Table 170) that affect how the substories are selected and executed. In the preferred embodiment, those parameters are as follows:

A) Time to Prepare: the minimum amount of time that must pass from the time a "character forms a plan" to the time that the substory is actually executed.

B) Time to Execute: the amount of storyline time used by execution of a substory.

C) Import: this parameters indicates the newsworthiness of a substory. Higher values indicate greater newsworthiness. The import value is used to determine which events to include in the various characters' Headlines lists, with events of greatest newsworthiness being placed highest in the Headlines lists.

D) Audience: a value of 0 (NoAudience) indicates an event that nobody other than the Subject can witness (e.g., a mental event), a value of 1 (AnyAudience) indicates this event has no special audience requirements and can be witnessed by anyone without restriction, a value of 2 (PositiveAudience) indicates an event for which there must be an audience (e.g., an event involving a boast), a value of 3 or 4 (PrivateAudience) indicates a crime or the like that is intended to be private (e.g., to be witnessed only by the Subject and Direct object of the event), a value of 5 (ExcludeIndObjAudience) is a event that must not be witnessed by a specific character (the Indirect Object of the event), and a value of 6 (AllAudience) indicates an event that is known to everyone instantly.

E) Expression: is an indirect reference to the procedure for generating the video sequence associated with this event. In the preferred embodiment, this is a single reference to a particular video action sequence procedure. In alternate embodiments, several parameters might be required to define the video images and/or audio sounds to be generated while a particular planned event (i.e., substory) is executed.

Storyline Execution Method

Figure 9:
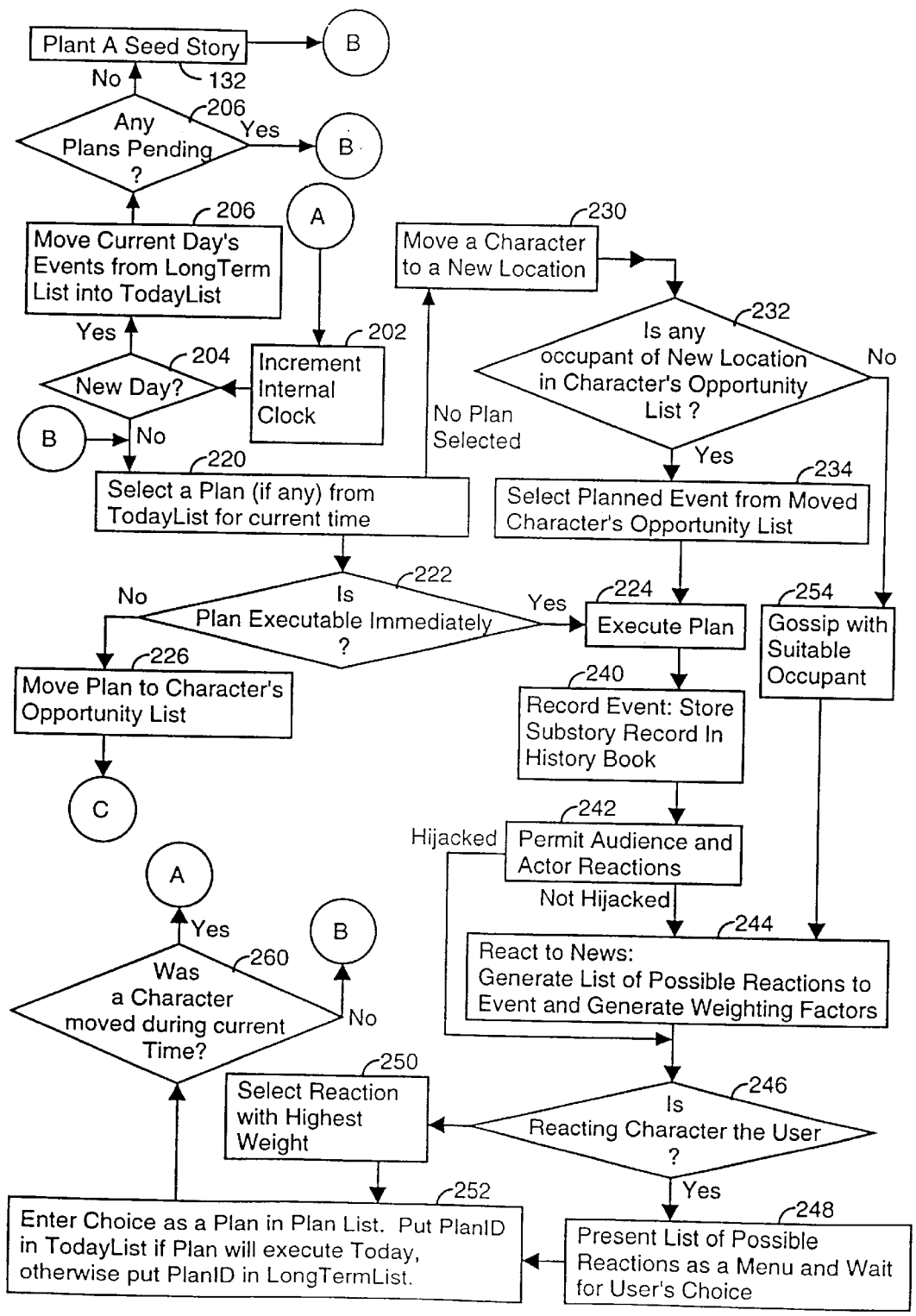
FIG. 9 is a top level flow chart of a preferred embodiment of video game software incorporating the present invention.

Referring to FIG. 9 depicts a flow chart of the method by which a storyline is generated in the preferred embodiment of the present invention. Appendices 1 through 6 contain pseudocode representations of some of the most relevant portions of the preferred embodiment. Prior to generation of a storyline the user will select or be assigned control of one of the characters in the storyline. Any time that the user's character is called upon to react to an event witnessed by the user's character, to react to news of an event not witnessed by the user's character, or to otherwise make a plan to perform an action (i.e., to select a substory to perform), the user is asked to select a plan from a set of possible reaction plans.

A master clock loop in the system's main program 200 (see Appendix 1) keeps track of the passage of time in the simulated world of the storyline being generated. In the preferred embodiment, each "day" in the simulated world of the storyline has 1024 time units, each equivalent to about one minute (with about 7 hours in each 24-hour day being skipped). The internal clock of the master clock loop in incremented (step 202) in steps of one time unit, and for each time unit the following steps are performed.

First, if the new time value represents a new day (step 204), the TodayList 128 is cleared and then the planned events in the LongTermList 130 for the current day are moved into the TodayList 128 (step 206). Then the main scheduler checks to see if no plans are pending (step 208) for all time. If no plans are pending, a "seed story" is planted (step 210) by storing a single seed event (or alternately a set of seed events) in the Plan List and a pointer to that plan in the TodayList 128. Then normal operation of the system resumes with step 220.

At step 220 the main program looks to see there are any plans in the TodayList with a scheduled Time equal to or before the current time. If there is at least one such plan, the first or earliest such plan listed in the TodayList is selected (step 220). The selected plan is then checked to see if it is executable immediately (step 222). A plan is executable immediately if and only if (A) the subject and direct object (if the plan has a direct object) are at the same location, or (B) the plan has a subject but does not have a direct object. If the selected plan is executable immediately, the planned substory is executed (step 224). If the selected plan is not executable immediately, the selected plan is added to the Opportunity List 152 for the subject of the planned substory (step 226).

A plan is "added to the Opportunity List" by adding an entry referencing the planned substory to the Opportunity List 152. Furthermore, if the slot of the Opportunity Array 150 corresponding to the planned substory's subject and direct object is empty, a pointer to the new opportunity list entry is inserted into that slot of the Opportunity Array 150. If that slot of the Opportunity Array 150 is not empty, a pointer to the new opportunity list entry is added to the last opportunity list entry in the Opportunity List 152 corresponding to the planned substory's subject and direct object.

All the plans for the current time that are currently executable are executed, as will be described below in more detail. In addition, every M time units (e.g., every 4 time units in a preferred embodiment), the main program performs step 230. At step 230 the main program moves a selected character to a new location. In the preferred embodiment, when there are N characters in a storyline, each of characters has a unique assigned character identifier (Character ID) between 1 and N, and each character is moved to a new location once every N time units. In particular, each character is moved when (*current time modulo M*)+1=*Character ID* where "Character ID" is the character's character identifier. Other mechanisms for determining when to move characters to new locations can be used in alternate embodiments. The MoveCharacter procedure is shown in more detail in Appendix 2.

In the preferred embodiment, step 230 is performed as follows: the planned events referenced by the opportunity array for the character to be moved are checked until a planned event is found that can be executed immediately. This typically requires that all the required participants other than the Subject must be located at a single location and that the required characters not be "occupied" by another event that is being executed. If any such immediately executable plan is found, then the character to be moved is moved to the location of the direct object for the planned event. If no such immediately executable plan is found in the opportunity array, then the selected character is moved to a randomly selected location.

At step 232 the main program determines if any occupant of the moved character's new location is the direct object of a plan in the moved character's Opportunity List. If so, a planned event is selected from the moved character's opportunity set (step 234) which is immediately executable (i.e., all the required characters for the planned substory are present and are not occupied by the execution of any other event). The substory corresponding to the selected plan is then executed (step 224).

The Substory Execution step 224 may or may not result in anything corresponding to the executed substory being displayed on the system's display device 106, depending on the implementation of the invention. In one preferred embodiment, the user only learns of executed substories when the character being played by the user is asked to react to events observed by that character or is asked to react to another character telling the user's character of a particularly newsworthy event. In a second preferred embodiment the execution of the event is played out of the display device 106 for the user to see. Furthermore, in preferred embodiments of the invention, many, if not all, executed events will generate audio outputs such as words spoken by the characters as well as sound effects and music relating the actions performed when a substory is executed.

The execution of a planned substory generates an event record 136 that is stored in the history book 134 as an history event entry (step 240). The structure and contents of the history book were previously discussed with respect to FIG. 4. When an executed event is stored in the history book, the "WhoKnows" flags for all Witnesses and Participants in the event are set to True. In this way the system executing the entertainment program can determine which characters already know about the executed event. The ExecuteEvent procedure is shown in more detail in Appendix 3.

React To News

After a substory is executed and a record of the event is stored in the history book, witnesses to the event (including the direct object and the subject of the event) are given the opportunity to react to the event at steps 242 and 244. In particular, a ReactToNews procedure is executed first for each of the non-participating witnesses, then the ReactToNews procedure is executed for the direct object and finally for the subject of the executed substory. The ReactToNews procedure can generate a single reaction plan for each such witness, direct object and subject. Thus, a single executed event can potentially result in the generation of many reaction plans.

In the preferred embodiment, each witness can generate only one such reaction plan, but this limitation is circumvented through the use of "chained events". A set of "chained events" is a set of substories where the execution of a first certain substory always results in the subject of the executed substory making a plan to execute a corresponding second substory. In other words, calling the "ReactToNews" procedure after execution of the first reaction substory results in the generation of a plan which has the same subject as the first reaction substory. In some cases, execution of the second substory always results in the subject of the executed substory "making a plan" (i.e., in the ReactToNews procedure generating a plan) to execute a corresponding third substory, and so on.

The first step of the ReactToNews procedure is to allow the reacting character to have an "emotional reaction" to the event which was just executed, or the event which the character just learned about from another character, by calling the EmotionalReaction procedure, and the second step is to formulate either zero or one reaction plans in reaction to the event.

The EmotionalReaction procedure updates the personality profile of the character reacting to a past event. Table 1 shows an example of a typical personality profile adjustment. In that example, "SubstoryData" refers to the Substory Parameter Table 170, "Personality[Who]" refers to the personality profile of the character whose personality profile is being adjusted, the variables "ChangeInXX" represent an amount used for adjusting personality profile parameters XX, where XX is any of the first four inter-personal relationship parameters in the Relationship Table 164 of the character whose personality profile is being adjusted. The AdjustAffection, AdjustDominance and other Adjust . . . procedures are the procedures which update the Personality Profile Tables 164. Appendix 4 contains a more detailed pseudocode representation of the Emotional Reaction procedures.

TABLE 1

Example of Steps Performed by EmotionalReaction Procedure When One Character Reacts to a Previously Executed Event Compute Personality Changes:
    ChangeInDominanceSubject =
        -SubstoryData[SubstoryVerb].Import DIV 8
    ChangeInAffectionIndObject =
        -Personality[Who].Trust[Subject] DIV 8
    IF Who = DirObject Then
        ChangeInAffectionSubject = 8
Store Computed Changes in Personality Profile Tables:
    If ChangeInAffectionSubject ≠ 0 Then
        AdjustAffection(Who, Subject,
            ChangeInAffectionSubject)
    If ChangeInDominanceSubject ≠ 0 Then
        AdjustDominance(Who, Subject,
            ChangeInDominanceSubject)
    If ChangeInAffectionDirObject ≠ 0 Then
        AdjustAffection(Who, DirObject,
            ChangeInAffectionDirObject)
    If ChangeInDominanceSubject ≠ 0 Then
        AdjustDominance(Who, DirObject,
            ChangeInDominanceDirObject)
    If ChangeInAffectionIndObject ≠ 0 Then
        AdjustAffection(Who, IndObject,
            ChangeInAffectionIndObject)
    If ChangeInDominanceIndObject ≠ 0 Then
        AdjustDominance(Who, IndObject,
            ChangeInDominanceIndObject)
    If ChangeInTrustSubject ≠ 0 Then
        AdjustTrust(Who, Subject, ChangeInTrustSubject)
    If ChangeInTrustIndObject ≠ 0 Then
        AdjustTrust(Who, IndObject, ChangeInTrustIndObject)

The second step of the ReactToNews procedure, is to generate either zero or one new plans for the reacting character.

As mentioned earlier, each substory in the matrix of defined substories has a predefined set of possible reaction substories. In some cases, the set of available reaction substories will be different for the subject, direct object, and other witnesses. In the preferred embodiment, the ReactToNews procedure is called once for each witness. To select a reaction plan, the ReactToNews first stores identifiers for the set of possible reaction plans. For example, in an example from the preferred embodiment a set of five possible reaction plans is indicated as follows:

Result[1]=ColdGreeting
Result[2]=SuspiciousGreeting
Result[3]=DominantGreeting
Result[4]=FormalGreeting
Result[5]=LukewarmGreeting Then "weights" are computed for the set of possible reaction plans. In the preferred embodiment, two methods are used to compute such weights. In one method, the weight for each possible reaction plan is individually computed. For example:

```
Weight[1] := 20 - Personality[Who].Affection[LSubject]
Weight[2] := -10 - Personality[Who].Trust[LSubject]
Weight[3] := Personality[Who].Dominance[LSubject]
Weight[4] := 10
IF Affection[LSubject] < 30 THEN
    Weight[5] := 2 * Personality[Who].Affection[LSubject]
ELSE
    Weight[5] := 0
END
``` where "Personality[Who].Affection[LSubject]" is the value in the Relationship Table 164 of the character that is reacting to the execution of a substory, representing the reacting character's Affection for the subject of the executed substory, "Personality[Who].Trust[LSubject]" represents the reacting character's Trust in the subject of the executed substory, and "Personality[Who].Dominance[LSubject]" represents the reacting character's Dominance over the subject of the executed substory. The weight computation formulas can utilize any personality characteristics represented in the relationship tables 164, the personality profile table, as well as information in the history book.

As indicated above, the selection of a reaction to an event can be based on whether the reacting character has already performed a particular substory. An example of such a selection method, where X is the subject of the event being reacted to, is as follows:

```
Result[1] = TellOff
Result[2] = SlapFace
Result[3] = PlanRevenge
Found1 = SearchHistoryBook for Event with Who as Subject, X as
    DirObject and SubstoryVerb=TellOff
Found2 = Search HistoryBook for Event with Who as Subject, X as
    DirObject and SubstoryVerb=SlapFace
IF Found1 & Found2 THEN
    Weight[3] = 100
ELSE IF Found1
    Weight[2] = 100
ELSE
    Weight[1] = 100
END
```

In the above example, the ReactToNews procedure generates a plan for the reacting character, Who, to perform the PlanRevenge substory if in past events the reacting character has already performed the TellOff and SlapFace events with X as a direct object. If in past events the reacting character has already performed the TellOff event but not the SlapFace event, the ReactToNews procedure generates a plan for the reacting character to perform the SlapFace event. Otherwise, the ReactToNews procedure generates a plan for the reacting character to perform the TellOff event.

The second method of computing weights for the set of possible reaction substories is (A) to compute a single "plan selector" value, (B) to determine which integer K between 1 and N, inclusive, is closest to the computed selector value, where N is the number of possible reaction substories, and (C) to then assign the highest possible weight to Weight[K] while assigning the other weights values of zero.

In both cases, after weights are computed for the possible reaction substories, unless the reacting character is the one being played by the end user (step 246), the reaction substory with the highest weight is selected (step 250). If the highest weight is equal to zero, no plan is generated in reaction to the executed substory for the character for whom the ReactToNews procedure was called. Otherwise, when the highest weight is greater than zero, a plan is generated corresponding to the reaction substory with the highest weight. In the generated plan, the reacting character is denoted as the subject of the planned substory, the subject of the "causal substory" (i.e., the substory which is being reacted to) is usually denoted as being the direct object of the planned substory. The time associated with the plan is set equal to the current time in the simulated world, plus the "Time to Prepare" value associated with the planned substory (see FIG. 8). More details on the process of generating a plan are found in Appendix 5.

The ReactToNews procedure can be selectively configured (by the author of each particular entertainment program utilizing the present invention) for each type of executed event to not make reaction plans for various classes of characters simply by comparing the identity of the character for whom the ReactToPlans procedure is being executed against planning enablement criteria associated with the prior event to which the character is reacting, and then not generating a plan for any character not meeting the planning enablement criteria. In many cases, none of the witnesses (other than the prior events participants) will generate a reaction plan having a nonzero weight.

If the reaction plan generated for any witness has an associated execution time that is "immediate" (e.g., less than 3 time units in the future, in the preferred embodiment) then the storyline associated with the just executed substory is said to be "hijacked" by that witness, and the Hijacked flag in the History Book entry for the executed substory is set to True. Once the Hijacked flag for a previously executed event is set to True, none of the other witnesses other than the subject of the event is allowed to generate any further reaction plans to that event. However, even after an event is "hijacked", the Personality Profile of each of the witnesses is still updated by calling the EmotionalReaction procedure for each of the event's witnesses.

If the direct object of the last executed substory is the character controlled by the user (step 246), then the user is presented with a list of possible reactions and then the system waits for the user's selection (step 248). Otherwise, the reaction plan assigned the highest weight in step 244 is selected (step 250). The selection reaction plan is then added to the Plan List 124 (step 252). The scheduled execution time for the selected reaction time is set equal to the current time plus the "Time to Prepare" value associated with the selected substory (see FIG. 8).

It is noted here that in the preferred embodiment, for some events the set of possible reaction substories is to formulate a lie (i.e., a false historical event) and to store that lie in the history book. The "lie" is not "executed" as an event, but is stored in the History Book and in the Headlines List of the character whose selected reaction plan was to formulate the lie. That lie is then told to other characters when this character "gossips" with other characters (step 254, discussed below) and then those characters tell other characters. "Lies" generally are assigned high newsworthiness values, and thus tend to have a relatively high likelihood of being retold to other characters.

In addition, the ReactToNews procedure includes special provisions for reacting to gossip which is a lie. In particular, the ReactToNews procedure can be configured to determine if the recipient knows that the received gossip is a lie by searching whether the recipient knows about the lie's causal event (i.e., the event which liar reacted to be generating a lie). In that case, the ReactToNews procedure can be configured so as to formulate a plan for the recipient of the fallacious news to confront or otherwise hurt the character that generated the lie.

More details on the ReactToNews and EmotionalReaction procedures are shown in Appendices 4 and 5.

Main Program After Executing ReactToNews

If the end user is the character reacting to an event, or news of an event (step 246), the user selects the reaction substory to be entered into the Plan List. Otherwise, at step 250, the main program selects the one of the possible reaction substories having the highest computed weight.

At step 260 the main program determines whether a character was moved during at current time. Note that it is possible to reach this point in the storyline generation process by executing a previously made plan, without having yet moved a character. If this is the case, the main program resumes execution at step 220. Otherwise the main program resumes execution at step 202.

Gossip: Communicating News of Past Events

As described above, at step 232 the main program determines if any occupant of the moved character's new location is the direct object of a plan in the moved character's Opportunity List. If not, the moved character "gossips" with a suitable occupant of the moved character's location (step 254).

In particular, a gossip procedure (see Appendix 6) selects the character at the same location as the moved character towards whom the moved character has the highest loquaciousness value (see Relationship Table 164 in FIG. 7).

Then the gossip procedure compares the headlines list for the moved character with the selected character, and in particular selects the highest item in the moved character's headlines list 144 (FIG. 4) that is not already known by the selected character. In addition, the gossip procedure prevents the selection of any headlines item if telling the selected character about the headlines item would be adverse to the telling character's best interests. This determination is made by calling the EmotionalReaction procedure with the "VirtualReaction" flag set to True, causing the EmotionalReaction procedure to generate three parameters: FlattersSubject, FlattersDirObject, and FlattersIndObject:

EmotionalReaction (z, Who, VirtualReaction=True, FlattersSubject, FlattersDirObject, FlattersIndObject)

where "Who" is the moved character and z is the history book index of the candidate event in the moved character's headlines list.

Next, the gossip procedure determines whether a item is "good gossip" by computing a value called GoodGossip:

```
z = History Book Index for the candidate event in the headlines list
OldS = History[z].Subject
OldD = History[z].DirObject
OldI = History[z].IndObject
GoodGossip = FlattersSubject × Personality[Who].Affection[OldS] +
    FlattersDirObject × Personality[Who].Affection[OldD]
IF (OldI's value indicates the event had an indirect object) THEN
    GoodGossip = GoodGossip +
        FlattersIndObject × Personality[Who].Affection[OldI]
```

The GoodGossip parameter is built from components relating to the subject, direct object and indirect object (if any) of the candidate event. Each component will be a positive value if the candidate event flatters that character and the moved character has a positive Affection value for that character, or if the candidate event does not flatter the subject (i.e., has a negative "flatters" value) and the moved character has a negative Affection value for that character. If the GoodGossip value is positive, telling the headlines item to other characters is not adverse to the moved character's interests, and thus a plan to perform the "TellNews" substory is generated and stored in the Plan List:

```
IF GoodGossip > 0
    Generate Plan to perform TellNews substory with selected
        character as the subject and the candidate event as the
        third object.
```

Furthermore, the Gossip procedure prevents the telling of a headlines item to the selected character when the headlines item represents fallacious events allegedly involving the selected character.

If any headlines item exists that meets the above discussed selection criteria, that headlines item is selected and then the Gossip procedure generates a plan (with a specified preferred execution time equal to the next available time value) to immediately perform the "TellNews" substory with the moved character as the subject, the selected character as the direct object, and the event corresponding to the selected headlines list item as the third object of the planned event:

```
Plan.Verb = TellNews    {Substory identifier for planned Substory}
Plan.Subject = Moved Character
Plan.DirObject = Character to whom news is to be told
Plan.ThirdObject = History Book Index for the news event
Plan.Time = Current Time + 1.
```

When the planned TellNews substory is executed (step 244), the following steps are performed. The ExecuteEvent procedure first calls a procedure called BuildTale, which traces through the History Book and builds a list called the "Tale" of all events which are the causal events of the news event to be told to the direct object. The BuildTale procedure excludes from the Tale events not known to the character who is the subject of the planned TellNews substory and also excludes events already known to the specified recipient.

Each event recorded in the History Book includes a CausalEvent parameter, which is a pointer to a previous event (if any) that is the recorded event's causal event. Using the CausalEvent parameters in the History Book, each such causal event is added to the Tale list until a zero CausalEvent value is found, indicating an event with no known causal event. In addition, each event recorded the History Book includes a ConsequentEvent parameter, which is a pointer to an event (if any) that resulted from a reaction to the recorded event. Using the ConsequentEvent parameters in the History Book, each such consequent event is added to the Tale list until a zero ConsequentEvent value is found, indicating an event with no known consequent event.

After the Tale list has been built, each event in the Tale is communicated to the specified recipient. The events in the Tale are communicated to the specified recipient in the same sequence that they occurred. The WhoKnows flag corresponding to the recipient for the communicated event is set, and the ReactToNews procedure is called for each such event communicated to the recipient to give the recipient the opportunity to generate an emotional reaction (i.e., to revise that character's relationship table) and to possibly generate a reaction plan (step 244). Furthermore, the most newsworthy of the communicated events are entered into the recipient's headlines list and the Tell Tree 140 is updated accordingly.

As explained above, the ReactToNews procedure evaluates all possible reaction substories that the recipient of the gossip could select by computing functions associated with each of the possible substories. The functions generally are computations based on the character profiles of the character reacting to the news of an event.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX 1
MAIN PROGRAM

```
    Minute = 0
 5  Gameday = 1
    Initialize all arrays
    Store initial set of seed story events in the PlanList
    Newday {initializes TodayList}

10  REPEAT {FOREVER, more or less}
       Gameclock = 1024 x (Gameday -1)
       While Minute ≤ 1023
          If at least one event is planned for the current time
             BEGIN
15              REPEAT for each event planned for the current time
                   J = (ptr to next planned event for current time in
                      TodayList)
                   Check event J to see if can be executed (i.e., are
                      all required participants at the same location, and
20                    are those participants not otherwise occupied)
                   If Event J is executable
                      ExecuteEvent (J)   {See Appendix 3}
                   Else
                      BEGIN
25                      SJ = Subject of Event J
                        DO = Direct Object of Event J
                        Add Event J to the Opportunity List
                        If the corresponding Opportunity Array slot is
                           blank (i.e., Opportunity Array(SJ,DO)=0 )
30                         Add pointer at Opportunity Array(SJ,DO) to the
                           Opportunity List slot for Event J
                        Else
                           Link the Opportunity List slot for Event J to
                           the last plan in the Opportunity List for the
35                         (SJ,DO) pair of characters.
                      END
                END
             END Repeat {event loop}

40     If (Minute MOD 4) = 0
          Call MoveCharacter(Minute)

Minute = Minute + 1
       GameClock = GameClock + 1
45     END {WHILE Minute Loop}

If Game Termination Conditions Are Met
         Terminate Game

50     NewDay  {Moves planned events for next day into the
                TodayList, Garbage collects the PlanList, Stores
                another seed story in the PlanList if the Plan List
                is empty, etc.}
    END {day loop}
```

- 37 -

APPENDIX 2
MOVECHARACTER PROCEDURE

```
     Procedure: MoveCharacter
 5   {Select Character to Move:}
     Who = (Minute DIV 4) MOD CharacterCount + 1
     If Who is not already occupied by another event
        Scan First Item in Who's Opportunity Array For each other
           Character to determine if that Item represents a Planned
10         Event that can be executed (i.e., all required participants
           are at the same location, and those participants are not
           otherwise occupied).
        Select the first such Event found.
     If an Executable Event is found
15      J = (ptr to selected event)
        Move Who to the location of the direct object of the
           selected event.
        ExecuteEvent (J)
     Else
20      Move Who to a randomly selected location (Z)
        Scan All Items in Who's Opportunity Array for each other
           Character that is located at location Z to determine if
           any such Item represents a Planned Event that can be
           executed (i.e., all required participants are at the same
25         location, and those participants are not otherwise
           occupied).
        Select the first such Event found.
     If an Executable Event is found
        J = (ptr to selected event)
30      ExecuteEvent (J)
     Else
        Call Gossip (Who, Z)
     END
     END
35   END
     RETURN
```

APPENDIX 3
EXECUTE EVENT PROCEDURE

```
     Procedure: ExecuteEvent (J)
     {This Procedure Executes an Event, Lets the appropriate
     characters React to the event by creating plans for new events,
45   and Records the executed event in the History Book.}

Subject, DirObj and ThirdObj = Subject, Direct Object and Third
        Object of event J 50   If Event = TellNews
     {When the executed event is a TellNews event in which one
     character telling another character about a prior event, the
     BuildTale procedure reviews the HistoryBook and creates a list
     called the "Tale" of all the related events, and then the
```

- 38 -

```
        Direct Object of the TellNews event is allowed to react to each
        of the events in the Tale.}
           Generate associated video images and audio output, if any.
           Call BuildTale
 5         For each event in Tale
              {If DirObj's Headlines List has an empty Slot OR (event is
              more newsworthy than the least newsworthy event in DirObj's
              Headlines List, put event in DirObj's Headlines List}
              Call EnterTale (event, DirObj)
10            Call ReactToNews (Event, DirObj)
           End Else {regular event}
           Generate video images and audio output associated with
15         execution of event J.
           Record Event J in History Book
           Set "WhoKnows" flags to True for all Witnesses and
              Participants in the Event
           {Witness Loop}
20         For each witness to the event (excluding Subject and DirObj)
              If NOT Event.Hijacked
                 Call ReactToNews (Event, Witness)
              If Witness ≠ Arthur
                 Call EmotionalReaction(Event, Witness)
25         END {Witness loop}

If NOT Event.Hijacked
              Call ReactToNews (Event, DirObj)
           If Witness ≠ Arthur
30            Call EmotionalReaction(Event, DirObj)
        End {ReactToNews is called for Subject to implement Multi-Event
        reactions to prior events, in which each executed event causes
35      the Subject to then plan to execute the next event in the
        sequence.}
        Call ReactToNews (Event, Subject)

Store Record of Executed Event in HistoryBook
40      Mark the Executed Event's participants as occupied for period
           of time equal to Event.TimeToExecute If Recorded Event "Creates a Lie"
           Store the Lie as an event in the History Book
45         Mark the New Event as Fallacious
        {Note:  The WhoKnows flag for the Character who "created" the
                lie was previously set.}
        RETURN 50
                           APPENDIX 4
                   EMOTIONAL REACTION PROCEDURES
```

```
Procedure: EmotionalReaction (Substory, Who, VirtualReaction,
   FlattersSubject, FlattersDirObject, FlattersIndObject)

LSubject = Substory.Subject
 5   LDirObject = Substory.DirObject
     LIndObject = Substory.IndObject
     Verb = Substory.Verb        {Substory Identifier}

ChangeInAffectionSubject   = 0
10   ChangeInDominanceSubject   = 0
     ChangeInAffectionDirObject = 0
     ChangeInDominanceDirObject = 0
     ChangeInAffectionIndObject = 0
     ChangeInDominanceIndObject = 0
15   Case Verb
        AcceptApology:
          Begin
          ChangeInDominanceSubject =
             -Personality[Who].Dominance[LDirObject] DIV 8
20        ChangeInAffectionSubject =
             -Personality[Who].Dominance[LDirObject] DIV 8
          End
          ...
        AccompanyMedicalMission:
25        Begin
          ChangeInAffectionSubject =
             Personality[Who].Affection[LDirObject] DIV 8
          If Who = DirObject Then
             ChangeInAffectionSubject = 16
30        Else If Male ≠ Personality[LDirObject].Sex
             ChangeInAffectionSubject = ChangeInAffectionSubject - 16
               × Personality.Relationship[LDirObject]
          End
          ...
35      AccuseBurnCrops thru AccuseVandalize:
          Begin
          ChangeInAffectionSubject =
             -(Personality[Who].Affection[LIndObject] DIV 4)
          ChangeInDominanceSubject =
40           -SubstoryData[Verb].Import DIV 10
          ChangeInAffectionIndObject =
             -(Personality[Who].Trust[LSubject] DIV 8)
          End
          ...
45      GetDrunkWith:
          Begin
          IF Who = DirObject Then
             ChangeInAffectionSubject = 8
          End
50
          ...
     End Case If VirtualReaction Then
```

```
    Begin
      FlattersSubject = ChangeInAffectionSubject -
        ChangeInDominanceSubject + ChangeInTrustSubject
      FlattersDirObject = ChangeInAffectionDirObject -
5       ChangeInDominanceSubject + ChangeInTrustDirObject
      FlattersIndObject = ChangeInAffectionIndObject -
        ChangeInDominanceIndObject + ChangeInTrustIndObject
    End
  Else
10  Begin
      If ChangeInAffectionSubject ≠ 0 Then
        AdjustAffection(Who, LSubject, ChangeInAffectionSubject)
      If ChangeInDominanceSubject ≠ 0 Then
        AdjustDominance(Who, LSubject, ChangeInDominanceSubject)
15    If ChangeInAffectionDirObject ≠ 0 Then
        AdjustAffection(Who, LDirObject,
          ChangeInAffectionDirObject)
      If ChangeInDominanceSubject ≠ 0 Then
        AdjustDominance(Who, LDirObject,
20        ChangeInDominanceDirObject)
      If ChangeInAffectionIndObject ≠ 0 Then
        AdjustAffection(Who, LIndObject,
          ChangeInAffectionIndObject)
      If ChangeInDominanceIndObject ≠ 0 Then
25      AdjustDominance(Who, LIndObject,
          ChangeInDominanceIndObject)
      If ChangeInTrustSubject ≠ 0 Then
        AdjustTrust(Who, LSubject, ChangeInTrustSubject)
      If ChangeInTrustIndObject ≠ 0 Then
30      AdjustTrust(Who, LIndObject, ChangeInTrustIndObject)
    End Procedure: AjdustAffection(Who, ForWhom, HowMuch)

35  Value = Personality[Who].Affection[ForWhom]
    Acceder = Personality[Who].Empathy
    IF Howmuch > 0 THEN
      TempLong = 100 - Value
    ELSE
40    TempLong = 100 + Value
    Value = Value + (Howmuch × TempLong × Acceder) DIV 10000
    Personality[Who].Affection[ForWhom] = Value 45  Procedure: AjdustDominance(Who, ForWhom, HowMuch)

Value = Personality[Who].Dominance[ForWhom]
    Acceder = Personality[Who].Submissive
    IF Howmuch > 0 THEN
50    TempLong = 100 - Value
    ELSE
      TempLong = 100 + Value
    Value = Value + (Howmuch × TempLong × Acceder) DIV 10000
    Personality[Who].Dominance[ForWhom] = Value
```

```
    Procedure: AjdustTrust(Who, ForWhom, HowMuch)

Value = Personality[Who].Trust[ForWhom]
 5  Acceder = Personality[Who].Gullible
    IF Howmuch > 0 THEN
      TempLong = 100 - Value
    ELSE
      TempLong = 100 + Value
10  Value = Value + (Howmuch x TempLong x Acceder) DIV 10000
    Personality[Who].Trust[ForWhom] = Value

APPENDIX 5
15              REACT TO NEWS PROCEDURES

PROCEDURE: ReactToNews (Substory, Who, HistoryPtr)
    Clear Result[] and Weight[] arrays
    If Who ≠ Arthur
20    EmotionalReaction(Substory, Who, False, x1, x2, x3)

LSubject = Substory.Subject
    LDirObject = Substory.DirObject
    LIndObject = Substory.IndObject
25
    For i = 1 to MaxConsequences
    Begin
      NewDirObject[i] = LSubject
      If (Who = LSubject OR Who = LDirObject)
30      NewIndObject[i] = 0
      Else
        NewIndOjbect[i] = LIndObject
        NewThirdObject[i] = 0
    End
35
    Case Verb
      AttemptKiss:
        Result[1] = SpurnKiss
        Result[2] = ShyAwayFromKis
40      Result[3] = Tease
        Result[4] = FailedKiss
        Result[5] = Kiss
        Result[6] = KissRedHot
        x = (Affection[LSubject] -
45        (Faithfulness(Who,LSubject) DIV 2) + Submissiveness DIV
          2) DIV 10
        SelectWeight (x,6,True)
        ...
      AttemptRaid:
50      IF Who=LSubject THEN
          BEGIN
            Result[1] = DisasterRaid
            Result[2] = UnsuccessfulRaid
            Result[3] = SuccessfulRaid
```

```
            NewDirObject[1] = LDirObject
            NewDirObject[2] = LDirObject
            NewDirObject[3] = LDirObject
            x = 48 + (MyRandom MOD 32)
            Check History for prior event ="TipOffRaid" with
               subject equal to LSubject.
            If Check History is successful, THEN
               x = x + 40
               y = (Strength + Personality.[LDirObject].Strength -
                  x) DIV 32
               SelectWeight(y, 3, TRUE)
            END
         ...
      ColdGreeting:
         IF Who = LDirObject THEN
            BEGIN
               z = History[SourceEvent].CausalEvent
               IF History[z].Verb = BumpsInto THEN
                  BEGIN
                     Result[1] = ColdGreeting
                     Result[2] = SuspiciousGreeting
                     Result[3] = DominantGreeting
                     Result[4] = FormalGreeting
                     Result[5] = LukewarmGreeting
                     Weight[1] = 20 -
                        Personality[Who].Affection[LSubject]
                     Weight[2] = -10 - Personality[Who].Trust[LSubject]
                     Weight[3] = Personality[Who].Dominance[LSubject]
                     Weight[4] = 10
                     IF Personality[Who].Affection[LSubject] < 30
                     THEN
                        Weight[5] = 2 ×
                           Personality[Who].Affection[LSubject]
                  END
            ELSE
               BEGIN
                  Result[1] = GotToGoNow
                  Result[2] = NeverMind
                  Result[3] = WhatsEatingYou
                  Weight[1] = Personality[Who].Submissive -
                     Personality[Who].Affection[LSubject]
                  Weight[2] = Personality[Who].Empathy -
                     Personality[Who].Affection[LSubject]
                  Weight[3] = Personality[Who].Empathy +
                     Personality[Who].Affection[LSubject]
               END
         END
      ...
   End Case Select highest weight potential result:
      besti = i for Result[i] with highest Weight[i]
   Reaction.Subject = Who
```

```
    Reaction.Verb = Result[besti]          (Substory identifier)
    Reaction.DirObject = NewDirObject[besti]
    Reaction.IndObject = NewDirObject[besti]
    Reaction.ThirdObject = NewDirObject[besti]
 5  Reaction.Location = Substory.Location
    Reaction.CausalEvent = SourceEvent     (Prior Substory Index)
    Reaction.ConsequentEvent = 0

Enter Plan (Reaction) in Plan Queue
10  Substory.Hijacked = Substory.Hijacked OR
       ( (Gameclock ≤ Substory.Time + 3) AND
         SubstoryData[BestResult].TimeToPrepare = 1 )
    END
    RETURN
15

PROCEDURE: SelectWeight (SelectorValue, HighestIndex,
    OpenBottom)
       BEGIN
20        FOR i = 1 TO HighestIndex DO
             BEGIN
                IF i = 1 THEN
                   BEGIN
                      IF OpenBottom THEN
25                       LowerTest = -32000
                      ELSE
                         LowerTest = 0
                      UpperTest = 1
                   END
30             ELSE
                   BEGIN
                      LowerTest = (i - 1)
                      IF i < HighestIndex THEN
                         UpperTest = LowerTest + 1
35                    ELSE
                         UpperTest = MaxInt
                   END
                IF (SelectorValue > LowerTest) & (SelectorValue ≤
                UpperTest) THEN
40                 Weight[i] = MaxInt
                LowerTest = LowerTest + 1
             END
       END

45
                          APPENDIX 6
                       GOSSIP PROCEDURE

Procedure: Gossip (Who, Z)
50
    ToWhom = the character at location Z having the highest
             loquaciousness value in Who's relationship table For each item in Who's headlines list
```

- 44 -

```
      IX = history book index for current headlines item

{If item is unknown to ToWhom}
      If Not (HistoryBook[IX].WhoKnows[ToWhom]) Then
 5      Begin
            {Determine whether telling about this event would be
            beneficial or injurious to "Who":}
            EmotionalReaction (IX, Who, VirtualReaction=True,
               FlattersSubject, FlattersDirObject, FlattersIndObject)
10
            OldS = History[IX].Subject
            OldD = History[IX].DirObject
            OldI = History[z].IndObject
            GoodGossip = FlattersSubject  x
15             Personality[Who].Affection[OldS] +
               FlattersDirObject x Personality[Who].Affection[OldD]
            IF (OldI's value indicates the event had an indirect
               object) THEN
            GoodGossip = GoodGossip +
20             FlattersIndObject x Personality[Who].Affection[OldI]

{If the Headlines item represents a fallacious event}
         If History[IX].Fallacious THEN
            BEGIN
25             {If the headlines item represents a fallacious event
               involving the selected character "ToWhom", prevent it
               from being told to the selected character.}
               If History[IX].Subject = ToWhom OR
                  History[IX].DirObject = ToWhom) THEN
30                GoodGossip = -1
            END IF GoodGossip > 0 THEN
            BEGIN
35             Generate Plan to perform TellNews substory with selected
               character as the subject and the candidate event as the
               indirect object:

Plan.SubstoryVerb = TellNews
40             Plan.Subject = Moved Character
               Plan.DirObject = ToWhom
               Plan.ThirdObject = IX {History Book Index for the news
                  event}
               Plan.Time = Current Time + 1
45          END
      Continue until GoodGossip > 0 OR Last Headlines Item has been
         processed
      RETURN
```

What is claimed is:

1. A method of generating a sequence of images representing a dynamically generated story line, comprising:

establishing a set of characters;

defining a set of re-usable substories, a multiplicity of the substories representing an action by a subject comprising a selectable one of the characters where the action is performed with respect to at least one object comprising at least a selectable one of the characters; for each substory, establishing a set of possible reaction substories comprising a subset of the set of re-usable substories;

establishing a plan list for storing plans indicating ones of the substories to be performed;

storing in the plan list an initial set of plans, each of the stored plans representing a substory to be performed;

executing ones of the substories represented by the plans stored in the plan list;

establishing a physical position for each of the characters and updating the characters' physical positions during the executing step;

establishing a current time and advancing the current time during the executing step;

generating, in reaction to each executed substory, additional plans to perform additional ones of the substories wherein the additional substories comprise selected ones of the set of possible reaction substories for the executed substory; and storing the generated plans in the plan list; the plan list at times storing a multiplicity of the generated plans;

the generating plans step including receiving, in reaction to at least a subset of the executed substories, input from an end user and selecting at least a subset of the additional substories in accordance with the end user input;

the plan generating step including assigning each generated plan an earliest execution time and a set of associated characters including a subject and an object, wherein the subject and object are each a specified one of the characters;

each stored plan in the plan list including the assigned earliest execution time, subject and object, such that at various times at least a subset of the plans in the plan list have respective earliest execution times that are later than the current time;

at least a subset of the generated plans comprising deferred plans, where each deferred plan's execution is deferred because its earliest execution time is later than the current time and/or its associated characters are not physically proximate each other;

the executing step including selecting for execution one plan from those of the stored plans in the plan list whose associated earliest execution time is at least as early as the current time and that meet opportunity availability criteria, the opportunity availability criteria including a requirement that the characters associated with the one plan have physical positions that are proximate to one another;

wherein the generated plans are executed in a different order than those generated plans are added to the plan list by the generated plans storing step.

2. The method of claim 1, the initial set of plans including plans whose earliest execution time is later than an initial value for the current time, wherein the initial set of plans guide the sequence of executed substories along a story line by ensuring that predefined events take place via execution of substories corresponding to plans in the initial set of plans.

3. The method of claim 1, including storing history data representing the executed substories;

the plan generating step including, when generating a plan in reaction to at least one of the substories, reviewing the history data, generating a set of weight values for the set of possible reaction substories, wherein at least one of the weight values is based on the presence or absence of a corresponding substory in the history data, and generating a plan to perform the one of the possible reaction substories having a maximum or minimum weight value.

4. The method of claim 1, the executing step including determining which of the characters participated in each executed substory as the subject and object(s) thereof and determining which of the characters witnessed each executed substory;

the generating plans step including generating, in reaction to each of at least a subset of the executed substories, a plurality of additional plans to perform additional ones of the substories wherein each of the plurality of plans include plan data indicating a specified one of the possible reaction substories and a subject, the indicated subject in each of the plurality of plans comprising a different one of the set of characters consisting of the characters who participated and the characters who witnessed the executed substory.

5. The method of claim 4, wherein for at least a subset of the substories, the set of possible reaction substories for each substory includes at least two distinct sets of possible reaction substories, each distinct set corresponding to a different one of the subject, direct object and witnesses of the execution of the substory.

6. A computer based system for generating a sequence of images representing a dynamically generated story line, comprising:

a computer memory that stores structures and executable procedures representing a set of characters and a set of re-usable substories; a multiplicity of the substories representing an action by a subject comprising a selectable one of the characters where the action is performed with respect to at least one object comprising at least a selectable one of the characters; for each substory, establishing a set of possible reaction substories comprising a subset of the set of re-usable substories;

a video display for displaying the sequence of images;

a user input device;

a central processing unit coupled to the computer memory for executing the procedures stored in the computer memory while utilizing the data structures; coupled to the video display for generating the sequence images on the video display while executing the procedures stored in the computer memory; and coupled to the user input device for receiving input from an end user;

the data structures stored in the computer memory further including a plan list for storing plans indicating ones of the substories to be performed;

the procedures stored in the computer memory and executed by the central processing unit including:

substory execution procedures for executing ones of the substories represented by the plans stored in the plan list;

the substory execution procedures establishing a current time and advancing the current time while the substories are executed; the substory execution procedures establishing and updating a physical position for each of the characters;

planning procedures for generating, in reaction to each executed substory, additional plans to perform additional ones of the substories wherein the additional substories comprise selected ones of the set of possible reaction substories for the executed substory, and for storing the generated plans in the plan list; the plan list at times storing a multiplicity of the generated plans; and the planning procedures including procedures for receiving, in reaction to at least a subset of the executed substories, input from an end user and selecting at least a subset of the additional substories in accordance with the end user input; wherein the planning procedures assign each generated plan an earliest execution time and a set of associated characters including a subject and an object, wherein the subject and object are each a specified one of the characters;

each stored plan in the plan list including the assigned earliest execution time, subject and object, such that at various times at least a subset of the plans in the plan list have respective earliest execution times that are later than the current time;

at least a subset of the generated plans comprising deferred plans, where each deferred plan's execution is deferred because its earliest execution time is later than the current time and/or its associated characters are not physically proximate each other;

the substory execution procedures including instructions for selecting for execution one plan from those of the stored plans in the plan list whose associated earliest execution time is at least as early as the current time and that meet opportunity availability criteria, the opportunity availability criteria including a requirement that the characters associated with the one plan have physical positions that are proximate to one another; and the generated plans are executed in a different order than those generated plans are added to the plan list by the planning procedures.

7. The system of claim 6, wherein the initial set of plans including plans whose earliest execution time is later than an initial value for the current time, wherein the initial set of plans guide the sequence of executed substories along a story line by ensuring that predefined events take place via execution of substories corresponding to plans in the initial set of plans.

8. The system of claim 6, the substory execution procedures including commands for storing history data representing each specific substory that has been executed;

the planning procedures including commands for, when generating a plan in reaction to at least one of the substories, reviewing substories in the history data, generating a set of weight values for the set of possible reaction substories, wherein at least one of the weight values is based on the presence or absence of a specific corresponding substory in the history data, and generating a plan to perform the one of the possible reaction substories having a maximum or minimum weight value.

9. The system of claim 6, the data structures stored in the computer memory further including history data representing each specific substory that has been executed; the history data including data representing which of the characters knows about each of the executed substories represented by the history data;

the substory execution procedures including commands for evaluating newsworthiness of the executed substories represented by the history data and selecting in accordance with predefined newsworthiness criteria a set of most newsworthy executed substories;

the set of reusable substories including at least one re-usable "gossip" substory having a subject, comprising a selectable one of the characters, who informs an object, comprising a different selectable one of the characters of one of the most newsworthy executed substories;

the substory execution procedures including commands for executing the gossip substory so as to pass information about a previously executed substory from a first one of the characters to a second one of the characters, and updating the history data so as to indicate that the second character knows of the previously executed substory;

the planning procedures including a procedure for generating a plan in reaction to execution of the gossip substory in which the second one of the characters is specified as the subject, and the planned substory is one of the set of possible reaction substories for the previously executed substory.

10. The system of claim 6, the substory execution procedures including commands for determining which of the characters participated in each executed substory as the subject and object(s) thereof and determining which of the characters witnessed each executed substory; and the planning procedures including commands for generating, in reaction to each of at least a subset of the executed substories, a plurality of additional plans to perform additional ones of the substories wherein each of the plurality of plans include plan data indicating a specified one of the possible reaction substories and a subject, the indicated subject in each of the plurality of plans comprising a different one of the set of characters consisting of the characters who participated in and the characters who witnessed the executed substory.

11. The system of claim 10, wherein for at least a subset of the substories, the set of possible reaction substories for each substory includes at least two distinct sets of possible reaction substories, each distinct set corresponding to a different one of the subject, direct object and witnesses of the execution of the substory.

* * * * *